United States Patent [19]
Eshed

[11] Patent Number: 6,115,056
[45] Date of Patent: Sep. 5, 2000

[54] FOCUSING ADJUSTMENT APPARATUS

[75] Inventor: David Eshed, Kfar Saba, Israel

[73] Assignee: CreoScitex Corporation Ltd., Herzlia, Israel

[21] Appl. No.: 09/056,114

[22] Filed: Apr. 6, 1998

[51] Int. Cl.[7] .................................................. B41J 15/14
[52] U.S. Cl. .......................... 347/242; 347/241; 347/257; 359/811
[58] Field of Search .................................... 347/241, 242, 347/233, 234, 257, 244, 256, 258; 359/819, 692, 811, 694, 822, 823

[56] References Cited

U.S. PATENT DOCUMENTS

| | | | |
|---|---|---|---|
| 5,109,460 | 4/1992 | Baek et al. | 385/115 |
| 5,168,288 | 12/1992 | Baek et al. | 347/240 |
| 5,221,997 | 6/1993 | Kamir | 359/694 |
| 5,357,617 | 10/1994 | Davis et al. | 712/245 |
| 5,385,092 | 1/1995 | Lewis et al. | 101/467 |

OTHER PUBLICATIONS

G.H. Neugebauer, "Designing Springs for Parallel Motion", *Tech Briefs*, pp. 119–120, Aug. 7, 1980.

*Primary Examiner*—N. Le
*Assistant Examiner*—Lamson D. Nguyen
*Attorney, Agent, or Firm*—Eitan, Pearl, Latzer & Cohen-Zedek

[57] ABSTRACT

Apparatus for adjusting the focus of an imaging apparatus is disclosed. The imaging apparatus includes a lens assembly which is attached to focus adjustment apparatus. The focus adjustment apparatus includes a pair of parallel flat springs attached at one end to a member supporting the lens assembly and an adjusting mechanism operative to cause the attached lens assembly to be moved so that the lens assembly moves in small increments while remaining perpendicular to the image being scanned.

23 Claims, 4 Drawing Sheets

FOCUSING ADJUSTMENT APPARATUS

FIELD OF THE INVENTION

The present invention relates to imaging apparatus for printing systems and particularly to apparatus for adjusting the focus of the imaging apparatus.

BACKGROUND OF THE INVENTION

In a typical printing press, such as the digital printing press described, for example, in U.S. Pat. Nos. 5,357,617 and 5,385,092 assigned to Presstek Inc. of New Hampshire, U.S.A, the drum forms part of the press. In another application, the drum may be a drum of a computer to plate image setter.

In the above mentioned patents assigned to Presstok Inc., the focusing apparatus comprises a plurality of IR (infrared) lasers diode, known in the art. The light emitted by each laser diode is focused by a corresponding focusing lens. Thus, a large number of lenses are required, whereby the complexity and the cost of the focusing apparatus increase.

In a second type of focusing apparatus, which is described in U.S. Pat. Nos. 5,109,460 and 5,168,288 assigned to Eastman Kodak Company (Kodak) of Rochester, N.Y., USA and schematically illustrated in FIG. 1 to which reference is now made; the thermal printer 10 includes a movable focusing apparatus 12 moving in the direction indicated by arrows 2 to affect line by line scanning on a drum 14 rotating about a longitudinal axis as indicated by arrow 16.

Optical focusing apparatus used in printing systems such as lithographic offset printing generally comprises optical fibers connected to a lens system. The optical focusing apparatus is fixed at a pre-determined distance from the printing drum. To adjust the focus, the whole lens system or one of the lenses within the system are moved to the required focusing position by moving the lenses relative to the light source.

The focusing apparatus, of U.S. Pat. Nos. 5,109,460 and 5,168,288 use an autofocus mechanism. The focusing apparatus 12 comprises an array of IR laser diodes 22A–22E. Each laser diode 22A–22E is attached to a corresponding optical fiber 24A–24E in a pigtail type attachment, the light emitting ends of the plurality of fiber optics are aligned at 26.

In this arrangement, the light from all IR laser diodes 22 is focused onto the drum 14 by a single optical assembly 28. The optical assembly 28 comprises a stationary lens assembly 30 and a movable focusing lens or lens assembly 32. In FIG. 1, an exemplary light path 34C is shown for the light emitted by laser diode 22C to affect exposure of the medium mounted on drum 14 at exposure spot 36C.

One drawback of IR laser diodes is that in order to obtain the output power required to expose the IR sensitive medium, fiber optics with a large diameter, typically 100 microns, and a large numerical aperture, typically larger than 0.2, are required. Moreover, in order to meet quality requirements of the exposed image, the focusing lens images the output of the fiber optics with a demagnification ratio of 3, thus leading to a numerical aperture of 0.6 towards the image plane.

Since the numerical aperture of the focusing lens is high, an autofocusing mechanism is designed to compensate for changes in the distance between the surface of the-printing member and the aligned light emitting end 26 of the fiber optics 24A–24E. This autofocusing compensation mechanism includes the movable lens or lens assembly 32 which is movable between stationary lens assembly 30 and the drum 14 as indicated by an arrow 4.

In the illustrated example, lens 32 moves to a second position 32' (dashed lines) as indicated by arrow 4 so as to change the optical path from 34 to 34' in order to expose the light sensitive medium in exposure spot 36C' thus compensating for the movement of the medium on the drum 14 as indicated by location 14' of the drum.

A drawback of autofocusing optical assemblies, in particular ones which provide an accuracy of the exposed spot in terns of location and spot size on the order of microns is their cost and complexity and the fact that they are prone to mechanical failures.

In U.S. Pat. No. 5,221,997 assigned to the present applicants, an alternative system is described for a lens assembly having a plurality of linearly arranged elements which permits each element to be individually adjusted from one access location of the assembly by means of an adjusting element One of the main disadvantages of existing focusing systems is that the more accurate the focusing required the more expensive the system needs to be. Furthermore, the adjustment of one of the lenses in a system may mis-align the overall lens arrangement.

SUMMARY OF THE INVENTION

It is an object of the present invention to provide an improved focusing system having a high degree of accuracy.

There is thus provided, according to a preferred embodiment of the present invention, focus adjustment apparatus for adjusting the focus of an imaging apparatus. The imaging apparatus includes a lens assembly which is attached to the focus adjustment apparatus. The focus adjustment apparatus includes an open box-like structure having four sides and an adjusting mechanism operative to cause the attached lens assembly to be moved. The box-like structure includes a support member, a restraining member connected to the lens assembly and a pair of parallel flat springs attached at one end to the support member and their other end to the restraining member. The restraining member is more flexible than support member.

In addition, there is also provided, according to a preferred embodiment of the present invention, a printing apparatus which includes a printing member mounted on to printing support means, at least one laser source that produces a focusing output, a lens assembly for guiding the output of the at least one laser source to focus on the printing member, and focus adjustment apparatus for adjusting the focus of the lens assembly. The laser source includes at least one infra red laser diode. The print support means includes a drum.

Furthermore, according to another preferred embodiment of the present invention, the printing apparatus further includes means for causing relative movement between the lens assembly and the print support means to effect a scan of the printing member by the laser source output.

Furthermore, according to a preferred embodiment of the present invention, the support member is attached to a movable base and the lens assembly is movable along an axis parallel to the pair of parallel flat springs.

Furthermore, according to a preferred embodiment of the present invention, the adjusting mechanism includes a stepper motor fixed to the movable base and a moving member coupled to the stepper motor. The stepper motor is configured for moving in steps of ±0.001 mm.

In addition, according to a preferred embodiment of the present, invention, the restraining member includes a "U"- shaped element having nibs at each end and the moving member is contiguous with one of the nibs.

In addition, there is also provided, according to a preferred embodiment of the present invention, a printing apparatus which includes a printing member mounted on to printing support,means, at least one laser source that produces a focusing output, a lens assembly for guiding the output of the at least one laser source to focus on the printing member, and focus adjustment apparatus for adjusting the focus of the lens assembly.

Furthermore, according to another preferred embodiment of the present invention, the printing apparatus further includes means for causing relative movement between the lens assembly and the print support means to effect a scan of the printing member by the laser source output.

Finally, there is provided, according to a preferred embodiment of the present invention, a method for adjusting the focus of an imaging apparatus, the imaging apparatus including a lens assembly. The method includes the steps of:

attaching focus adjustment apparatus to the lens assembly, the focus adjustment apparatus includes a pair of parallel flat springs attached at one end to a member supporting the lens assembly; and actuating one of the pair of parallel flat springs to move thereby to cause the lens assembly to move perpendicularly to the pair of parallel flat springs.

BRIEF DESCRIPTION OF THE DRAWINGS

The present invention will be understood and appreciated more fully from the following detailed description taken in conjunction with the appended drawings, wherein like reference numerals indicate corresponding or like components, in which.

DETAILED DESCRIPTION OF THE EMBODIMENT

Figure 1:
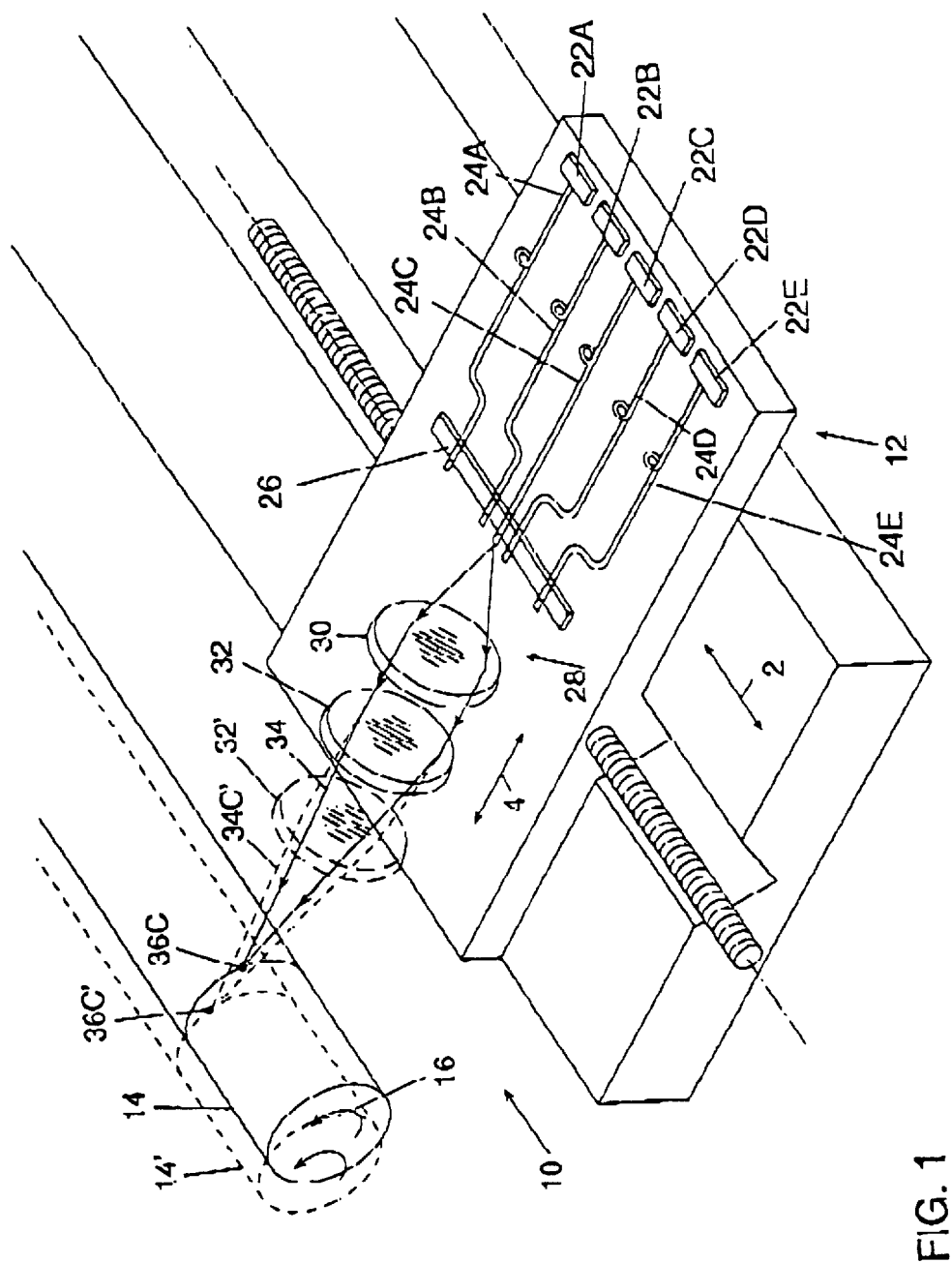
FIG. 1 is a schematic pictorial illustration of a printing system having a prior art focusing apparatus.
Figure 2:
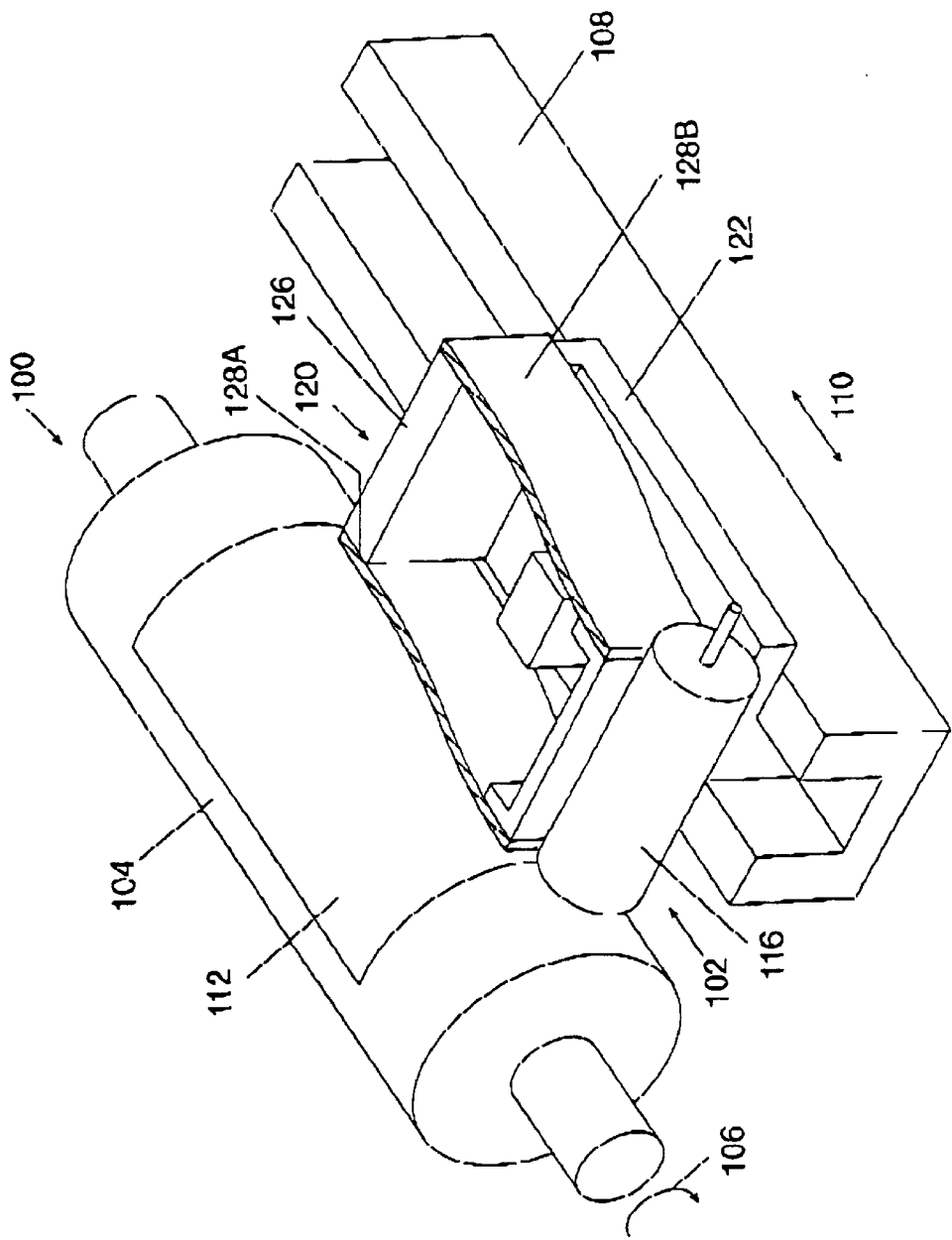
FIG. 2 is a schematic pictorial illustration of a printing system, constructed with an focusing apparatus according to a preferred embodiment of the present invention.

Reference is now made to FIG. 2 which schematically illustrates a typical printing system, generally designated 100 similar to the prior art printing system of FIG. 1, which comprises an imaging apparatus 102 and a drum 104. The drum 104 is mounted on a press or other similar assembly and is rotatable along a longitudinal axis illustrated by arrow 106. The imaging apparatus 102 is movable along a guiding support 108 as indicated by arrow 110 to effect scanning in a line by line mode of the printing member 112 mounted on the drum 104. The printing member 112 is wrapped around the drum 104 and is secured to the drum 104 by conventional clamping means.

In accordance with a preferred embodiment of the invention, the imaging apparatus 102 comprises a lens assembly 114 (see FIG. 4) which is constrained within a housing 116 and focusing apparatus 120 which is firmly attached to the housing 116. Housing 116 is fixed to focusing apparatus 120 so that the housing 116 is freely supported and does not come into contact with base 122 supporting focusing apparatus 120.

The printing system 100 may be any system operative to expose a printing member 112, with a pattern representing an image to be printed on it. The printing member 112 may be of any conventional construction. For example, in a digital offset press, or other similar offset press, the cylinder would preferably be the plate cylinder and the printing system would be mounted on the press proximate to this plate cylinder.

The cylinders and other components of these conventional presses are driven by components, such as stepper motors, well known in the art. All other electrical components, associated with those presses, are well known in the art. The movements of the plate cylinder (formed by the drum 104), blanket cylinder, impression cylinder and rollers are preferably coordinated depending upon the printing operation to be performed.

Figure 3:
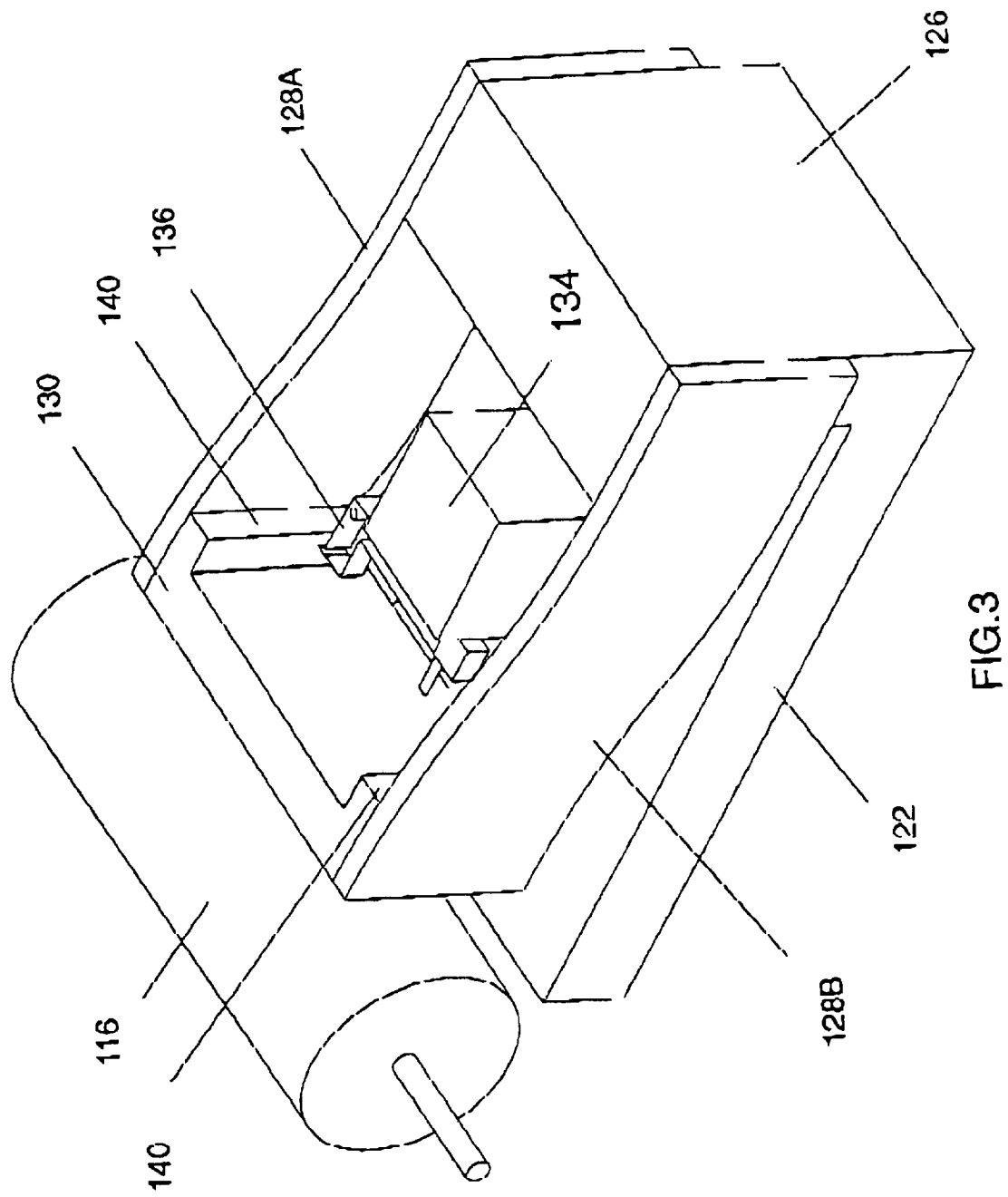
FIG. 3 is an isometric view of the focusing apparatus constructed with the focusing apparatus of FIG. 2, according to a preferred embodiment of the present invention.
Figure 4:
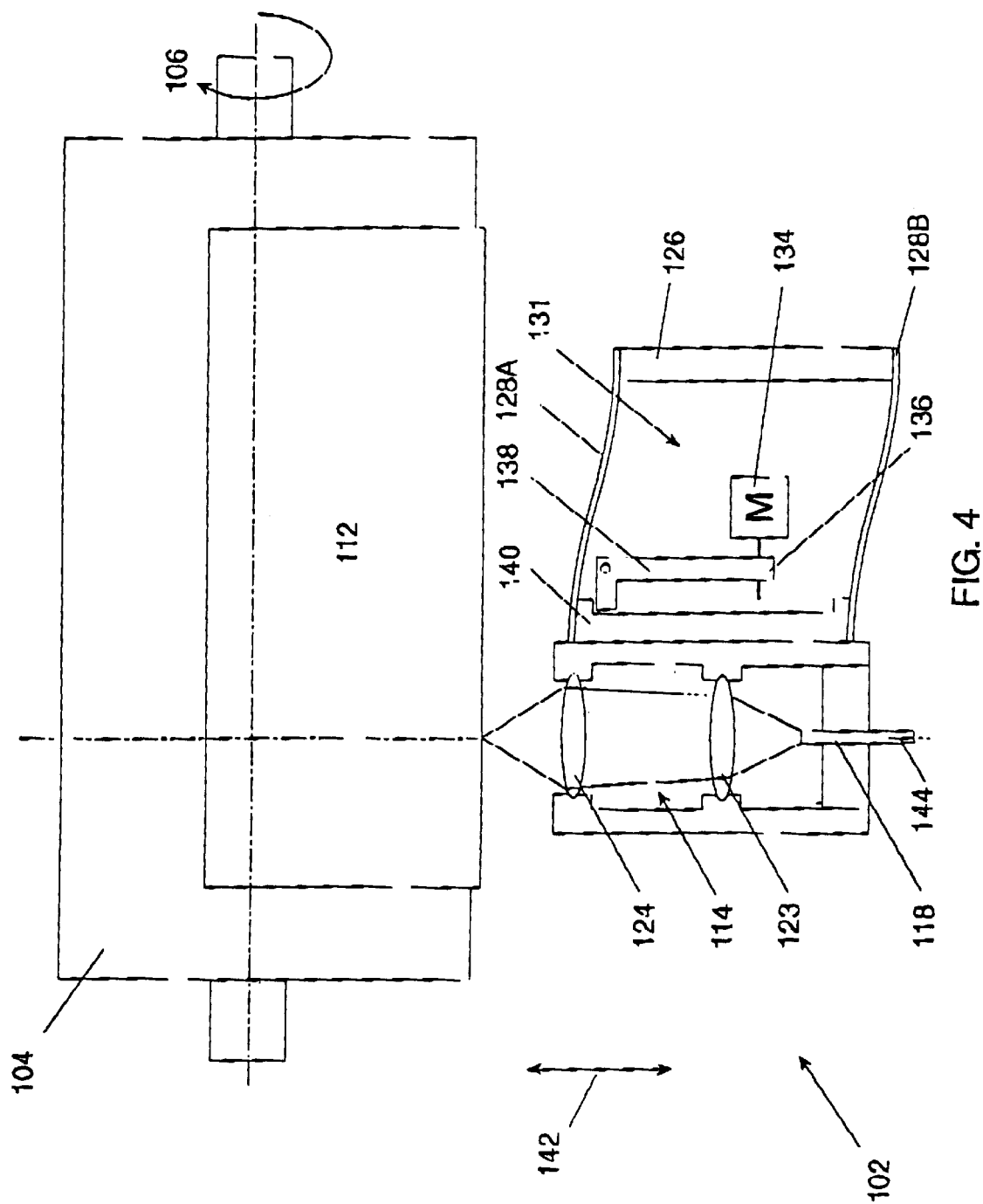
FIG. 4 is a schematic plan view of the printing system of FIG. 2.

Reference is now also made to FIGS. 3 and 4. FIG. 3 is a detailed isometric view of the focusing apparatus 120. FIG. 4 is a schematic plan view of printing system 100 constructed with the focusing apparatus 120 and lens assembly 114.

The imaging apparatus 102 comprises a lens assembly 114 and an array of IR laser diodes (not shown but similar to element 22 of FIG. 1), each of which is attached to a corresponding optical fiber 118, similar to the arrangement described hereinabove with respect to the prior art of FIG. 1. Preferably, the optical fibers 11B are aligned in front of the lens in a linear array with predetermined spacings therebetween, as described hereinabove.

The light from all IR laser diodes which is modulated in accordance to the information representing the image to be printed exposed on the printing member mounted on drum 104 is focused onto the drum 104 by lens assembly 114. The lens assembly 114 is illustrated for exemplary purposes only as comprising two lenses 123 and 124. It will be appreciated that lens assembly 114 may comprise any suitable arrangement of lenses.

The focusing apparatus 120 is firmly attached to movable base 122 by means of a support member 126. Support member 126 may be integrally formed with movable base 122 or alternatively, welded or otherwise suitably fixed thereto.

Focusing apparatus 120 comprises a pair of parallel flat (or leaf) springs 128A and 128B attached at one end to support member 126 and an adjusting mechanism 131 which is operative to move the leaf springs 128A and 128B. The other end of the pair of leaf springs 128A and 128B is attached to a restraining element 130.

As will be appreciated by person knowledgeable in the art flat springs may be of any suitable uniform rectangular cross section, either solid (as shown) or for example with cut-outs.

Restraining element 130, which is thinner and more flexible than support member 126 forms the fourth side of a generally open box-like structure of the focusing apparatus 120, the other-three sides comprising the pair of leaf springs 128A and 128B and support member 126.

Restraining element 130 is fixed to the housing 116 of lens assembly 114 by welding or other suitable means. As best seen in FIG. 3, focusing apparatus 120 is supported at one end only by support member 126. The opposite end, that is of restraining element 130 is freely supported by leaf springs 128A and 128B. Thus, the lens assembly 114, which is fixed to restraining element 130 is free to move perpendicular to the printing member 112 since the lens assembly is not in contact with the movable base 122.

Adjusting mechanism 131 comprises a suitable motor 134, such as a stepper motor, well known in the art. Preferably, stepper motor 134 is configured for movement steps of ±0.001 mm, to allow for extremely small adjustments.

Adjusting mechanism 131 further comprises a moving member 136, coupled to stepper motor 134. Member 136 which is shown for illustration purposes only, as having a generally "L" shape with a pointer 138 at one end is supported by motor 134 and is not in contact with base 122. As illustrated, restraining element 130 comprises a "U" shaped element having nibs 140 at each end. Thus, leaf springs 128A and 128B are attached to the nibs 140 of restraining element 130.

Pointer 138 is positioned so as to be contiguous with nib 140 so that movement of pointer 138 is on nib 140 causes leaf spring 128A to move as indicated by arrow 142, perpendicular to drum 104.

Since leaf spring 128A is one of a pair of leaf springs (128A, 128B) any movement of parallel leaf spring 128A will correspondingly move the whole lens assembly 114 (within housing 116) in parallel along an axis, indicated by line 144, perpendicular to the drum 104, without any distortion. Hence, by using a suitably stepped motor 134, it is possible to accurately adjust the focus of the optical apparatus without the expense and complexity of autofocusing apparatus.

It will be appreciated that the preferred embodiments describe hereinabove are described by way of example only and that numerous modifications thereto, all of which fall within the scope of the present invention, exist. For example, the printing system 100 may be a flat bed based printing system instead of a drum based system as illustrated and described hereinabove.

It will be appreciated by persons skilled in the art that the present invention is not limited to what has been particularly shown and described hereinabove. Rather, the scope of the present invention is defined by the claims that follow.

What is claimed is:

1. A focus adjustment apparatus for adjusting the focus of an imaging apparatus, said imaging apparatus comprising a lens assembly in communication with said focus adjustment apparatus, said focus adjustment apparatus comprising:
   a. at least a pair of substantially parallel flat springs, each of said springs having a first end in communication with a support member and a second end in communication with said lens assembly; and
   b. an adjusting mechanism in operative communication with at least one of said at least pair of substantially parallel flat springs at said second end thereof, thereby to cause said lens assembly to be moved substantially perpendicularly to the image being scanned by said imaging apparatus.

2. The apparatus of claim 1, wherein said focus adjustment apparatus further comprises an open box-like structure having four sides, said box-like structure including:
   i. a said support member in communication with said first end of said at least a pair of substantially parallel flat springs; and
   ii. a restraining member in communication with said lens assembly and said second end of said at least a pair of substantially parallel flat springs.

3. The apparatus of claim 2, wherein said support member is in communication with a movable base.

4. The apparatus of claim 3, wherein said adjusting mechanism comprises:
   a. a stepper motor in communication with said movable base; and
   b. a moving member in operative communication with said stepper motor.

5. The apparatus of claim 4, wherein said stepper motor is configured for moving in steps of ±0.001 mm.

6. The apparatus of claim 4, wherein said restraining member comprises a "U"-shaped element having nibs at each end and wherein said moving member is contiguous with at least one of said nibs.

7. The apparatus of claim 2, wherein said restraining member is of greater flexibility than said support member.

8. A printing system comprising;
   a. a printing member mounted on to printing support means:
   b. at least one laser source that produces a focusing output;
   c. a lens assembly for guiding the output of said at least one laser source to focus on said printing member;
   d. focus adjustment apparatus for adjusting the focus of said lens assembly, said focus adjustment apparatus comprising at least a pair of substantially parallel flat springs, each of said springs having a first end in communication with a support member and a second end in communication with said lens assembly; and
   e. means for causing relative movement between said lens assembly and said print support means to effect a scan of said printing member by said laser source output.

9. The system of claim 8, wherein said at least one laser source includes at least one infra red laser diode.

10. The system of claim 9, wherein said at least one infra red laser diode includes a plurality of infra-red laser diodes, each of said plurality of laser diodes for coupling with said at least one corresponding optical fiber, said optical fibers transporting said focusing output and aligned at a distance from said printing member.

11. A printing system comprising:
   a. a printing member mounted on to printing support means;
   b. at least one laser source that produces a focusing output;
   c. a lens assembly for guiding the output of said at least one laser source to focus on said printing member; and
   d. focus adjustment apparatus for adjusting the focus of said lens assembly; said focus adjustment apparatus comprising:
      a. an open box-like structure having four sides, said open box-like structure comprising:
         i. a support member;
         ii. a restraining member in communication with said lens assembly; and
         iii. at least a pair of substantially parallel flat springs, each of said springs having a first end in communication with said support member and a second end in communication with said restraining member; and
      b. an adjusting mechanism in operative communication with at least one of said at least a pair of substantially parallel flat springs at said second end thereof, thereby to cause said lens assembly to be moved.

12. The system of claim 11, wherein said support member is in communication with a movable base and wherein said lens assembly is movable along an axis substantially parallel to said at least a pair of substantially parallel flat springs.

13. The system of claim 12, wherein said adjusting mechanism comprises:
   a. a stepper motor in communication with said support member; and
   b. a moving member in operative communication with said stepper motor.

14. The system of claim 13, wherein said stepper motor is configured for moving in steps of ±0.001 mm.

15. The system of claim 13, wherein said restraining member comprises a "U"-shaped element having nibs at each end and wherein said moving member is contiguous with at least one of said nibs.

16. The system of claim 11, wherein said restraining member is of greater flexibility than said support member.

17. The system of claim 11, wherein said at least one laser source includes at least one infra red laser diode.

18. The system of claim 17, wherein said at least one infra red laser diode includes a plurality of infra-red laser diodes, each of said plurality of laser diodes for coupling with said at least one corresponding optical fiber, said optical fibers transporting said focusing output and aligned at a distance from said printing member.

19. A printing system comprising:
   a. a printing member mounted on to printing support means said printing support means includes a drum;
   b. at least one laser source that produces a focusing output;
   c. a lens assembly for guiding the output of said at least one laser source to focus on said printing member; and
   d. focus adjustment apparatus for adjusting the focus of said lens assembly, said focus adjustment apparatus comprising at least a pair of substantially parallel flat springs, each of said springs having a first end in communication with a support member and a second end in communication with said lens assembly.

20. A method for adjusting the focus of an imaging apparatus, said imaging apparatus comprising a lens assembly, said method comprising the steps of:
   attaching a focus adjustment apparatus to said lens assembly, said focus adjustment apparatus comprising at least a pair of substantially parallel flat springs, each of said springs having a first end in communication with a support member and a second end in communication with said lens assembly; and
   actuating at least one of said at least a pair of substantially parallel flat springs to move thereby to cause said lens assembly to move substantially perpendicularly to said at least a pair of substantially parallel flat springs.

21. The method of claim 20 wherein said actuating step comprises the step of adjusting said lens assembly in steps of ±0.001 mm.

22. The system of claim 19, wherein said at least one laser source includes at least one infra red laser diode.

23. The system of claim 22, wherein said at least one infra red laser diode includes a plurality of infra red laser diodes, each of said plurality of laser diodes for coupling with said at least one corresponding optical fiber, said optical fibers transporting said focusing output and aligned at a distance from said printing member.

* * * * *